(12) United States Patent
Six et al.

(10) Patent No.: US 8,132,218 B2
(45) Date of Patent: Mar. 6, 2012

(54) ACCESS/EDGE NODE SUPPORTING MULTIPLE VIDEO STREAMING SERVICES USING A SINGLE REQUEST PROTOCOL

(75) Inventors: Erwin Alfons Constant Six, Kalken (BE); Tom Van Caenegem, Schelderode (BE); Wim Van De Meerssche, Denderleeuw (BE); Filip De Turck, Steenhuize (BE); Tim Wauters, Buggenhout (BE); Bart Dhoedt, St.Kruis Brugge (BE)

(73) Assignees: Alcatel Lucent, Paris (FR); Universiteit Gent, Ghent (BE); Interuniversitair Microelectronica Centrum VZW (IMEC), Leuven (BE)

( * ) Notice: Subject to any disclaimer, the term of this patent is extended or adjusted under 35 U.S.C. 154(b) by 410 days.

(21) Appl. No.: 11/584,664

(22) Filed: Oct. 23, 2006

(65) Prior Publication Data

US 2007/0101377 A1    May 3, 2007

(30) Foreign Application Priority Data

Oct. 24, 2005  (EP) .................................... 05292236

(51) Int. Cl.
*H04N 7/18*  (2006.01)
*H04N 7/173*  (2011.01)

(52) U.S. Cl. ............... 725/86; 725/74; 725/82; 725/98; 725/119; 725/120

(58) Field of Classification Search .................... 725/88
See application file for complete search history.

(56) References Cited

U.S. PATENT DOCUMENTS

| | | | |
|---|---|---|---|
| 5,815,662 A | 9/1998 | Ong | |
| 6,973,667 B2 * | 12/2005 | Fritsch | 725/88 |
| 7,028,096 B1 * | 4/2006 | Lee | 709/231 |
| 7,228,558 B1 * | 6/2007 | Lebouill | 725/86 |
| 7,525,965 B1 * | 4/2009 | St. Pierre et al. | 370/390 |
| 2002/0042817 A1 | 4/2002 | Lahr | |
| 2002/0124258 A1 | 9/2002 | Fritsch | |
| 2002/0124262 A1 * | 9/2002 | Basso et al. | 725/109 |
| 2003/0088876 A1 * | 5/2003 | Mao et al. | 725/91 |
| 2003/0097661 A1 | 5/2003 | Li | |
| 2003/0225845 A1 * | 12/2003 | Hong | 709/206 |
| 2006/0161962 A1 * | 7/2006 | Hindle et al. | 725/115 |

OTHER PUBLICATIONS

D. He et al, "Distributing mpeg movies over the internet using programmable networks", Proceedings of the 22$^{ND}$, International Conference on Distributed Computing Systems. ICDCS 2002, Vienna, Austria, Jul. 2-5, 2002, International Conference on Distributed Computing Systems, Los Alamitos, CA, IEEE Comp. Soc., US, vol. Conf. 22, Jul. 2, 2002, pp. 144-153, XP010595527.

* cited by examiner

*Primary Examiner* — Justin Shepard
(74) *Attorney, Agent, or Firm* — Harness, Dickey & Pierce, P.L.C.

(57) ABSTRACT

An access/edge network node (300) according to the invention includes a single proxy function (301) to terminate on the subscriber side a single requesting protocol for a plurality of streaming video services.

13 Claims, 3 Drawing Sheets

ACCESS/EDGE NODE SUPPORTING MULTIPLE VIDEO STREAMING SERVICES USING A SINGLE REQUEST PROTOCOL

FIELD OF THE INVENTION

The present invention generally relates to packet based access/edge nodes having proxy functionality for various streaming video services like for instance broadcast TV, multicast TV, time-shifted TV, video-on-demand, etc. The proxy functionality entails terminating and interpreting the request signalling protocols for these streaming video services.

BACKGROUND OF THE INVENTION

In general, one can distinguish two types of video streaming services that are different in nature: broadcast services (the same content is streamed to several users watching simultaneously) and on-demand services (individualized content for one specific user). Examples of broadcast services are broadcast TV and multicast TV. Examples of on-demand services are time-shifted TV and video-on-demand. The way some of these services are currently implemented will be described in the following paragraphs.

In current packet based access/edge networks, live broadcast TV services or multicast TV services make use of a multicast architecture to deliver the TV channels to the end-users. The end-user typically uses a standardized multicast control protocol as request protocol to indicate which TV channel he/she wants to receive. An example of such a multicast control protocol is the Internet Group Management Protocol (IGMP) defined in Annex 1 of rfc 1112. The rfc 1112 from author S. Deering, entitled "Host Extensions for IP Multicasting" and published in August 1989, is retrievable from the IETF website on the Internet via the URL: http://www.ieff.org/rfc/rfc1112.txt?number=1112

To receive a broadcast or multicast TV channel, the host—e.g. the end user's set-top box featuring an IGMP client—exchanges IGMP messages with the network in order to join the multicast group for that TV channel. In the network, the access and/or edge nodes play an active role in packet based broadcast or multicast TV services by acting as an IGMP proxy. Alcatel's 7302 Intelligent Service Access Manager (ISAM) for instance has IGMP proxy functionality integrated on the linecards. A product brochure for release 2.1 of Alcatel's 7302 ISAM is available through the Internet via the following URL: http://www.alcatel.com/products/product-summary.jhtml?relativePath=/com/en/app/xml/opgproduct/alcatel7302intelligentservicesaccessmanagertcm228121931635.jhtml Paradyne's 4200 series of IP DSLAMs have an IGMP snooping and IGMP proxy function on the network interface card. A data sheet for Paradyne's 4200 IP DSLAM products is accessible via the URL: http://www.paradyne.com/products/4200IP/

The IGMP proxy functionality enables the access/edge node to intercept and interpret the IGMP requests received from end-users. This is often called state-based IGMP processing in literature. If the access/edge node already receives the requested TV channel, e.g. because another subscriber connected to this access/edge node is already watching the TV channel, then the TV channel will be forwarded to the new end-user requesting the TV channel. If the access/edge node does not yet receive the requested TV channel, then the IGMP join message received from the end-user will be forwarded to pull the requested TV channel from a multicast supporting node deeper in the network. Similarly, an IGMP leave message sent by an end-user who wants to stop watching a broadcasted or multicasted TV channel, is intercepted by the IGMP proxy in the access/edge node and only forwarded if needed.

Time-shifted TV is a service that enables the end-user to watch a broadcasted TV programme with a time shift, i.e. the end-user can start watching the TV programme from the beginning although the broadcasting of that TV programme has already started or is already finished. Dedicated home equipment, for instance a home Personal Video Recorder or home PVR device like Sony's High Definition Digital Video Recorder DHG-HDD500 enable time-shifted TV through a built-in memory (a hard disk or RAM) that can be programmed to record broadcasted TV programmes. The home PVR device enables recording a TV show and watching it at a later time, watching the show while it is being recorded, and watching a previously recorded show while simultaneously recording another TV show. Certain home PVR devices further have advanced features like pausing or rewinding while watching a broadcasted TV programme. To pause a broadcasted TV programme while watching it, the home PVR starts recording the broadcasted programme that is being watched and continues playing the programme on instruction of the viewer while it keeps recording the ongoing broadcast. There are however some limitations to time-shifted TV through home PVR devices because of the limited storage capacity and also the access link to the end-user's home (for instance an ADSL connection) has capacity or bandwidth restrictions. xDSL technologies for instance can serve in the order of 1-5 TV channels simultaneously. As a consequence, a home PVR device will always need programming in advance and the device will never be capable to record more than a few programmes or TV channels simultaneously.

A time-shifted TV service can also be offered through PVR functionality in the network. An example thereof is the distributed PVR solution described in Alcatel's earlier filed European Patent Application No. 05291959.4 filed on 21 Sep. 2005 with the European Patent Office. In principle, such network PVR solution enables the end-user to watch at any time any programme broadcasted on any channel. The end-user experience is similar to a video-on-demand service, but the content is live broadcasted or multicasted TV with an arbitrary time shift relative to the original broadcast time. For time-shifted TV service, the end-user typically uses an on-demand request protocol like for instance the Real Time Streaming Protocol or RTSP defined in rfc 2326, which is accessible via Internet URL: http://www.ieff.org/rfc/rfc2326.txt?number=2326

Video-on-demand is a streaming video service whereby the end-user can watch at any time content which is stored in a video server. The end-user again typically uses an on-demand request protocol like RTSP or SDP (Session Initiation Protocol). Assuming that RTSP is used as the on-demand request protocol for an on-demand service like video-on-demand (VoD), near video-on-demand (NVoD) or pay-per-view video, the streaming requests from the end-user are terminated on an RTSP proxy located near the video server, like for instance the SeaChange Session Resource Manager described in SeaChange's white paper "Video over IP" retrievable via the URL: http://www.schange.com/Downloads/IP_Streaming/VODOVERIP_WhitePaper.pdf For an on-demand service like time-shifted TV service implemented through distributed PVRs in access/edge nodes, the RTSP proxy intercepting the streaming requests from end-users might be integrated in the access/edge nodes as is suggested in Alcatel's European Patent Application EP 05291959.4 filed on 21 Sep. 2005 with the European Patent Office. Therein, the User Request Termination 413 in the onboard processor drawn in FIG. 4 may represent an RTSP proxy.

Summarizing the foregoing, according to the current state of the art, broadcast/multicast TV services on the one hand and on-demand video services like VoD, NVoD or time-shifted TV on the other hand are offered on different platforms with different request protocols, different network elements and proxies, different management and control functions involved. This results in over-complication of both the end-user equipment (e.g. the STB) and the proxy element logistics in the network nodes. An example prior art system is for instance drawn in FIG. 1. The Digital Subscriber Line Access Multiplexer (DSLAM) 100 depicted there is an access node that has separate platforms for broadcast services and on-demand services. For broadcast services, the IGMP proxy 101 intercepts IGMP requests received at port 111 at subscriber side, interprets these IGMP requests and forwards them to the next network node in the broadcast or multicast network via port 112 if needed. For on-demand services, RTSP proxy 102 intercepts RTSP requests received at port 113 at subscriber side, interprets these RTSP messages and forwards them to the next network node in service-on-demand network via port 114 if needed. The RTSP messages intercepted by RTSP proxy 102 are used to control a video programme cache memory 103 that is used for time-shifted TV service.

Separate platforms for different streaming video services further result in enhanced CAPEX and OPEX for the network operator because the bandwidth and storage resources cannot be deployed optimally.

In addition, having separate control and delivery platforms for broadcast TV services and on-demand services prevents the network nodes for instance from taking advantage of information that could be derived from monitoring the broadcast TV behaviour for updating the record profiles/algorithms used by the network PVRs for the time-shifted TV service. Vice-versa, information that could be derived from on-demand video services indicative for the capabilities of for instance the STB, is not taken advantage of to enable for instance a user-centric broadcast TV service wherein the delivered broadcast TV stream is adapted to the end-user's terminal capabilities (for instance through transcoding, authorization, access control, etc.).

An objective of the invention is to provide access/edge nodes that support multiple streaming video services without the above mentioned shortcomings of the state of the art solutions.

SUMMARY OF THE INVENTION

According to the present invention, the above mentioned drawbacks and shortcomings of the state of the art solutions are overcome by using a single request protocol, for instance a single on-demand protocol, to control multiple streaming video services, for instance a broadcast TV service and a time-shifted TV service. Thereto, as defined by claim 1, the access/edge node has to be equipped with an integrated proxy function that interfaces at the control plane with the request protocol clients of multiple streaming video services using the single on-demand protocol.

The use of such a single request protocol between the client (e.g. inside the set-top box or STB) and the proxy inside the access/edge node for multiple streaming video services will in general allow a tighter integration of the video control platforms and logic. This may not only result in savings of total number of network nodes that have to be deployed (CAPEX savings), but also in savings on management overhead and bandwidth resources deeper in the network (OPEX savings) as compared to when having two or more dedicated architectures or network elements offering these services. For instance, a cache function for time-shifted TV positioned along the live broadcast TV plane can make use of a caching algorithm that relies on both intercepted broadcast TV requests and intercepted time-shifted TV requests. The intercepted broadcast TV requests and time-shifted TV requests for example may steer the caching algorithm that decides which channels or programmes to cache. More specifically, both the number of viewers watching a TV channel live as well as the number of viewers watching that channel with a time shift, may be used as inputs to steer the caching algorithm in its selection of channels/programmes or fragments thereof that will be stored, and in its decision for how long to cache such programmes or fragments.

A further advantage of the current invention is a simplification in the end-user equipment. Since only one requesting protocol has to be supported, there is avoidance of duplication of control and management logic in the subscriber terminal defined in claim 11.

As defined in claim 2, the single protocol will typically be used to control broadcast video services such as broadcast TV or multicast TV, and to control on-demand video services such as time-shifted TV or video-on-demand.

As covered by claim 3, a good candidate for the single protocol is the standardized Real Time Streaming Protocol or RTSP. Using an on-demand protocol like RTSP for broadcast services allows the client to include not only the multicast address indicative for the channel that the client wishes to receive, but also to include additional information that may be useful to enhance a broadcast service to a more interactive or user-centric service and/or information that may be useful for a time-shifted TV caching element in the network.

Note that having a unique on-demand request protocol that is used between the client and the proxy for both simple broadcast TV viewing (channel requesting) and more interactive on-demand video viewing, does not exclude the use of a multicast protocol for broadcast services on the network side in order to preserve the multicast architecture there and to sustain bandwidth-efficient delivery of broadcast TV content deeper in the network. In such case, the access node according to the invention will be extended with a translation function as defined in claim 4.

As an example, the on-demand RTSP protocol may be used on subscriber side (between client and proxy) for both broadcast and on-demand video services, whereas on network side, the IGMP protocol is used to control the broadcast TV services whilst the RTSP protocol is used to control the on-demand services. This is covered by claim 5. Optionally, The RTSP protocol may be modified with some additional headers or information inside. The RTSP requests could for instance not only contain an identification of the requested channel and/or programme, but also from what time onwards the channel/programme must be displayed, enabling time-shifted TV watching. Further, RTSP by nature supports pause/rewind functionality for live broadcast TV service and pause/rewind/fast forward functionality for time-shifted TV service.

Also optionally, the access node according to the current invention may further host an intelligent cache memory for time-shifted TV services as defined by claim 6. Such an intelligent cache memory will use both information contained in requests for time-shifted TV programmes and information contained in requests for broadcasted TV programmes to update the record profiles or algorithm parameters according to which the selection is made of channels, programmes or programme fragments to store (claim 7), and the storage time thereof (claim 8).

The present invention further concerns a method for providing a plurality of streaming video services to a number of subscribers as defined in claim 10.

DETAILED DESCRIPTION OF EMBODIMENT(S)

Figure 1:
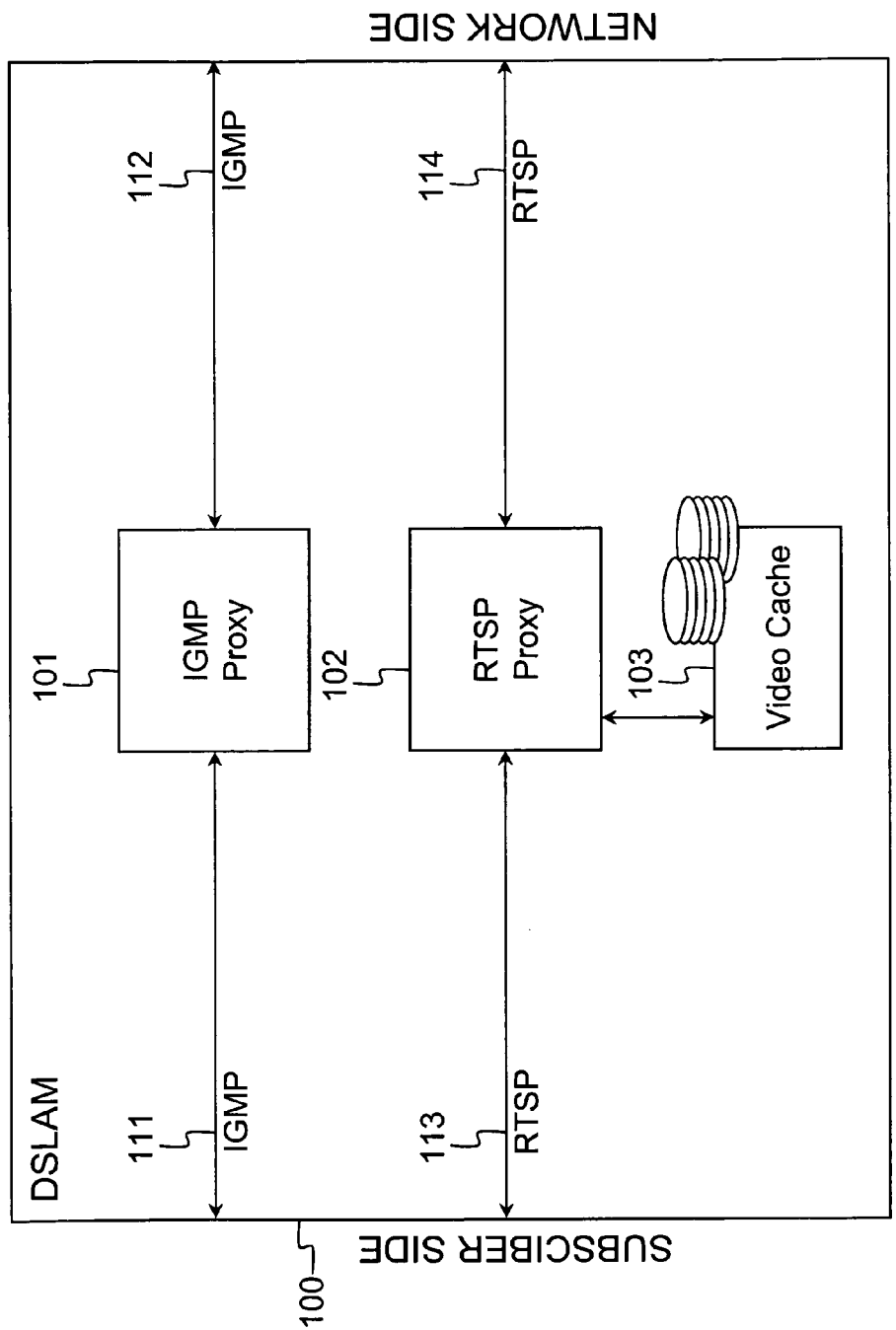
FIG. 1 illustrates an access node supporting multiple streaming video services according to the prior art.
Figure 2:
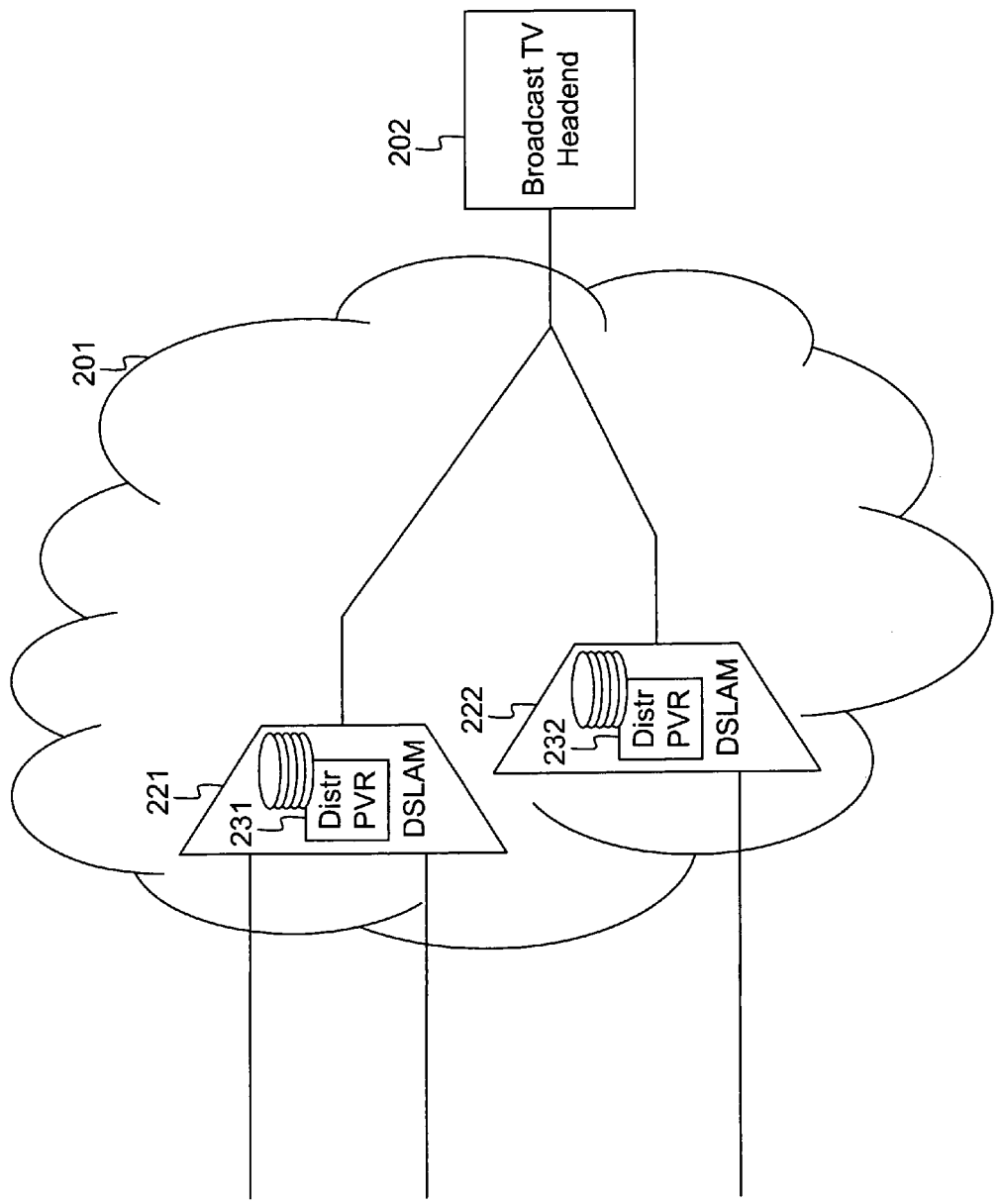
FIG. 2 illustrates an access network environment wherein the current invention is applied.

FIG. 2 shows a network environment wherein an embodiment of the present invention is implemented. The figure shows a Broadcast TV Headend 202 and a network 201 through which the Broadcast TV Headend 202 connects to the end-users. The access and aggregation network that forms part of network 201 is xDSL based. Two of the DSLAMs that terminate the ADSL or VDSL subscriber loops are shown as 221 and 222 in FIG. 2. These DSLAMs, in addition to the traditional DSL line termination boards and network termination board(s), contain a distributed PVR board, explicitly shown in FIG. 2 as 231 and 232 respectively. Through these distributed PVR boards, a unicast based time-shifted TV service is offered to the end-users on top of the broadcast TV service which is offered from the Broadcast TV Headend 202 and which relies on multicast tree structures setup for each broadcasted channel in network 201.

To request a broadcast TV channel or a time-shifted TV channel/programme, the set-top boxes (STBs) at the user premises connected to network 201 use a single on-demand signalling protocol, the RTSP protocol. As an example, the RTSP SETUP method could be used by the RTSP client in the set-top box when the user starts the TV service. Depending on whether a multicast/broadcast TV channel is requested or a unicast time-shifted TV channel/programme is requested, the exchanged transport parameters will be different. When requesting a multicast TV channel (e.g. CNN) from the Broadcast TV Headend 202 which is operated for instance by operator Belgacom, the RTSP SETUP message sent from the RTSP client in the user's STB to port 310 of the DSLAM will be as follows:

SETUP  rtsp://life_cnn.videoservice.belgacom.be/RTSP/1.0
CSeq: 302
Transport: RTP/AVP;multicast;

When requesting a time-shifted version of the programmes broadcasted earlier on the same TV channel (CNN), the RTSP SETUP message sent from the RTSP client in the user's STB to port 310 of the DSLAM will be as follows:

SETUP  rtsp://time_shifted_cnn.videoservice.belgacom.be/RTSP/1.0
CSeq: 302
Transport: RTP/AVP; unicast;client_port=4588-4589

In the latter case of a time-shifted request, the RTSP range option can indicate which part of the earlier transmitted stream is requested. Alternatively, the SETUP method may indicate the requested programme.

Figure 3:
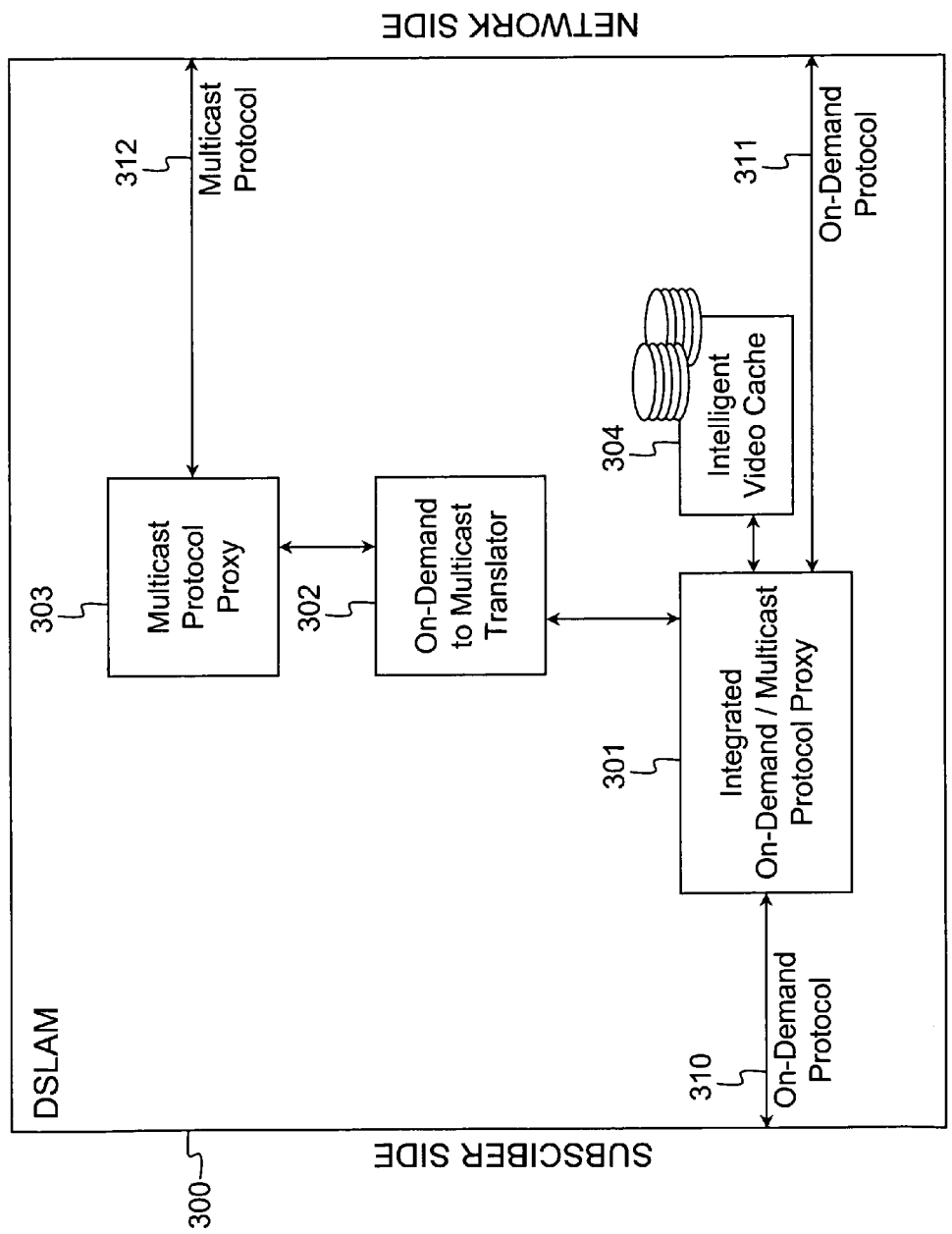
FIG. 3 illustrates an embodiment of the access node supporting multiple streaming video services according to the current invention.

The RTSP requests sent from the clients to port 310 of the DSLAM, are intercepted by an integrated RTSP proxy referenced by 301 in FIG. 3. For clarification, the DSLAM 300 in FIG. 3 is similar to DSLAMs 221 and 222 in FIG. 2, but FIG. 3 better highlights the functionality in these DSLAMs implementing the current invention. The integrated RTSP proxy 301 thus intercepts the RTSP requests from clients for broadcast TV channels as well as the RTSP requests coming from clients that request a time-shifted TV channel or programme to be streamed.

When receiving a request for a multicast TV channel, the RTSP proxy 301 verifies if that particular TV channel is already available, and if so, responds to the RTSP request whereupon the TV channel streaming towards the user's STB can start. In case the requested multicast TV channel is not yet available in DSLAM 300 (because no other user connected to DSLAM 300 is watching that TV channel), translator 302 will translate the RTSP request into an IGMP request that is forwarded by IGMP proxy 303 to the next IGMP aware node deeper in the network and directly or indirectly connected to port 312 of DSLAM 300. By using the IGMP protocol at the network side of the DSLAM 300, it is possible to maintain the multicast architecture for bandwidth efficient delivery of the broadcast TV channels from the Broadcast TV Headend 202 up to the DSLAMs, at the cost of some protocol translation/conversion logic. The RTSP-to-IGMP translator 302 thereto performs the translation and filtering between the on-demand control protocol (RTSP in the described embodiment) and the multicast control protocol (IGMP in the described embodiment).

When receiving a request for time-shifted delivery of a TV channel or TV programme, the RTSP proxy 301 will consult the Intelligent Video Cache 304 which will typically be integrated in a distributed PVR device like 231 and 232 in FIG. 2. The Intelligent Video Cache 304 is requested to start streaming the time-shifted TV channel or TV programme. In case the Intelligent Video Cache 304 is not able to deliver or to reconstitute the requested TV programme or TV channel, the RTSP request will be forwarded by integrated proxy 301 to the next RTSP aware node deeper in the network and directly or indirectly connected to port 311 of the DSLAM. Eventually, the RTSP request may be forwarded all the way up to a backup video server or TV server which stores all programmes on all TV channels.

An Intelligent Video Cache like 304 is useful in all access and edge network nodes that are part of a multicast tree structure for the live broadcasting of TV channels. The intelligent caching of broadcasted TV programmes fulfils entirely or partially the network recording functionality enabling the time-shifted TV service. The content that is cached in the Intelligent Video Cache memories is copied from live broadcasted TV streams, or eventually from time-shifted TV streams (TV streams that are requested with a time shift compared to the original time of live streaming). The intelligent cache algorithm in 304 decides what programmes or TV streams to store, when and for how long such content should be cached, and thereto takes into account information received from both live broadcast TV watching (by analyzing the information in the RTSP requests received for such live broadcasted TV channels) and time-shift requests (by analyzing information in the RTSP requests received for time-shifted TV streams or time-shifted TV programmes). Thus, both the intercepted broadcast TV requests and the intercepted time-shifted TV requests are shared between the integrated RTSP proxy 301 and the Intelligent Video Cache 304 to steer the caching algorithm in the Intelligent Video Cache 304.

As an example, the number of viewers watching a TV programme or TV channel live as well as the number of viewers watching that same TV programme or TV channel with a time shift, can steer the caching algorithm in its selection of channels, programmes or programme fragments to store, and in its decision for how long to store such content.

In another example, the information contained in the RTSP requests for broadcast TV could be used by the Intelligent Video Cache 304 residing in the same node to indicate when to start caching live broadcasted TV streams. The RTSP broadcast TV request issued by the end user's STB indeed may not only indicate the programme (title, starting time and end time) that is currently broadcasted on a TV channel, but also the starting time for the next programme. Such programme information is typically regularly downloaded in the STBs by IPTV middleware servers, to be used in the electric program guide (EPG). The Intelligent Video Cache 304 can use this information to know when a new programme starts, hence which next time window of the channel potentially has to be stored in the cache memory. This allows the cache algorithm to work in stand-alone mode, i.e. it does not need configuration input from a central server with respect to programming.

In yet another example, cache decisions are made based on the current request rates or predictions of future request rates and happen in real time, i.e. when the requests arrive at the access/edge node like DSLAM 300. Predictions of future request rates can be made by learning from current and past requests and dynamically updating parameters of known user request models for IPTV. In this case, the intelligent cache 304 may perform sliding interval caching: the cached content consists of segments of available streams with size that depends on the popularity of the content. These segments are initially growing prefixes of the stream (growing first part of the video stream), until the whole stream is stored or until a certain moment in time which is determined by the popularity of the content. In the first case where the whole video stream is stored, the service experience is similar to standard video-on-demand for the end-user. In the latter case, the segment size stops growing and the prefix starts to slide in such a way that only the most recent part of the video stream is memorized. This way, new requests can be served from start to finish within the appropriate window. Interactive commands like pausing, fast forwarding or rewinding can be supported by the intelligent cache 304 as long as they do not cross the borders of the current serving window.

The intelligent caching algorithm can be executed on each of the access/edge nodes in the broadcast TV multicast tree simultaneously. The intelligent caches can decide individually about which segments to store, for how long and with which size (hierarchical caching), or alternatively the intelligent caches can decide in cooperation with other intelligent caches in the multicast tree which segments to store, for how long and with which size (cooperative caching). For the cooperative caching, the intelligent caches can use peer-to-peer control messages. In case of hierarchical caching, the cache node will send an incoming request for a programme it cannot serve to the next cache in the path to the IPTV server. In case of cooperative caching, the cache node can forward the incoming request to another cache node at the same level in the multicast tree, storing the appropriate window of the requested programme. This way, storage space can be shared amongst different intelligent caches, which further enhances the efficiency of the IPTV caching solution, reduces the server and core network load, and results in a more balanced access network load.

It is noted that the use of the RTSP protocol for controlling both broadcast TV and on-demand time-shifted TV service, may further be taken advantage of in DSLAM 300 if technologies like scalable video encoding or user-centric video streaming are used. The RTSP protocol messages could contain information on the user terminal capabilities allowing for instance the integrated proxy 301 or the video streaming logic in DSLAM 300 to adapt video streams e.g. by transcoding or to modify the streams for other embedded functionalities inside the DSLAM like admission control and authorization. This is so because the RTSP protocol, like any other on-demand request protocol, allows to include all kinds of information, other than just the requested channel or programme, e.g. inside the SDP body, SDP being the Session Description Protocol which is used in combination with request protocols like RTSP or SIP.

Summarizing, the integrated RTSP proxy 301 intercepting and interpreting both requests for the broadcast TV service and the time-shifted TV service enables a single video control platform in the access or edge node (DSLAM 300) regardless whether the user watches live TV or TV with a time-shift. The set-top boxes or end user terminals connected to DSLAM 300 are simplified because they need only a unique RTSP client issuing both requests for the broadcast service and for the time-shifted service. The single video control platform in the access node 300 further enables intelligent video caching, user-centric or scalable video streaming, and optimized (reduced) bandwidth and storage capacity needs in the overall network 201, including less network elements to be deployed and less management overhead.

Although the present invention has been illustrated by reference to specific embodiments, it will be apparent to those skilled in the art that various changes and modifications may be made within the spirit and scope of the invention. It is therefore contemplated to cover any and all modifications, variations or equivalents that fall within the spirit and scope of the basic underlying principles disclosed and claimed in this patent application. For example, the xDSL technology might be replaced with other access technologies (e.g. PON or cable based access networks), the ports described above may be logically and/or physically combined, the different functional blocks 301, 302, 303 and 304 may be logically or physically integrated and may be implemented in software, hardware or a combination thereof (these functional blocks may for instance be integrated in a single ASIC or component, they may constitute part of a separate video card in the access node, or they can be implemented on the existing DSL linecards or network termination board, etc.). The RTSP-to-IGMP translator and the IGMP proxy which interfaces on the network side are optional and not needed in embodiments of the invention where no multicast tree structure is used up to the access node for delivery of broadcast TV channels. Also, the RTSP and IGMP protocols are given as an example of respectively an on-demand request protocol and a broadcast request protocol, but applicability of the current invention is not restricted to a particular request protocol. Any other existing request protocol, in particular on-demand request protocols like SIP (Session Initiation Protocol), HTTP (Hypertext Transfer Protocol), the different versions of ITU's H.323 protocol, or future versions, modifications or enhancements of any of these protocols could be used in the context of the current invention with same advantages.

The invention claimed is:

1. An access/edge network node comprising:
subscriber line terminating equipment, subscriber line aggregating equipment and network terminating equipment, for terminating and aggregating bi-directional data packet traffic from and to a number of subscribers on a subscriber side onto a network link on a network side;

a proxy unit having proxy functionality for a plurality of streaming video services, the proxy unit being configured to terminate on the subscriber side a single requesting protocol for at least two of said streaming video services, requests of the single requesting protocol each including an indicator capable of indicating a type of video service being requested; and a protocol translation unit configured to translate the single requesting protocol on the subscriber side into one of at least two requesting protocols on the network side.

2. An access/edge network node according to claim 1, characterized in that said at least two of said streaming video services comprise at least one streaming video service of on-demand nature and at least one video service of broadcast nature.

3. An access/edge network node according to claim 1, characterized in that said single requesting protocol is the Real Time Streaming Protocol (RTSP).

4. An access/edge network node according to claim 1, characterized in that said at least two requesting protocols on network side include the Real Time Streaming Protocol (RTSP) and the Internet Group Management Protocol (IGMP).

5. An access/edge network node according to claim 1, characterized in that said access/edge network node further includes a cache memory for steaming video with intelligent caching algorithm, operationally coupled with said proxy functionality and able to analyze information retrieved from said single requesting protocol and to thereupon decide intelligently which video channel or which video program to temporarily cache.

6. An access/edge network node according to claim 5, characterized in that said intelligent caching algorithm is further able to decide which fragments of a video program to cache.

7. An access/edge network node according to claim 6, characterized in that said intelligent caching algorithm is further able to decide how long to cache said fragments.

8. An access/edge network node according to claim 1, characterized in that said streaming video services include two or more of a broadcast TV service, a time-shifted TV service, a video-on-demand service, a near video-on-demand service, a multicast TV service, user-centric broadcast TV service, a pay-per-view TV service.

9. The access/edge network node of claim 1, wherein the at least two requesting protocols include at least one requesting protocol corresponding to a video service of an on-demand nature and at least one requesting protocol corresponding to a video service of broadcast nature.

10. An access/edge network node according to claim 1, further comprising:

first and second output interfaces, the first and second output interfaces being separate interfaces, the first output interface being configured to output requests associated with a first one of the at least two requesting protocols from the proxy translation unit to the network side, and the second output interface being configured to output requests associated with a second one of the at least two requesting protocols from the proxy translation unit to the network side.

11. A method for providing a plurality of streaming video services to a number of subscribers via an access/edge network node that terminates and aggregates bi-directional data packet traffic for said number of subscribers, the method comprising:

using between the subscriber terminal and said access/edge network node a single requesting protocol for at least two of said streaming video services, requests of the single requesting protocol each including an indicator capable of indicating a type of video service being requested;

proxying said single requesting protocol at said access/edge network node; and translating the single requesting protocol into one of at least two requesting protocols at the access/edge network node.

12. The method according to claim 11, wherein the access/edge network node includes first and second output interfaces, the first and second output interfaces being separate interfaces, the first output interface being configured to output requests associated with a first one of the at least two requesting protocols to a network side, and the second output interface being configured to output requests associated with a second one of the at least two requesting protocols to the network side.

13. A subscriber terminal able to terminate at a subscriber premises a plurality of streaming video services received over a subscriber line, the subscriber terminal being configured to communicate with a network through a network node, the network node including a proxy unit having proxy functionality for a plurality of streaming video services and a protocol translation unit, the subscriber terminal being characterized in that said subscriber terminal includes a single requesting protocol client of Real Time Streaming Protocol (RTSP) type for generating RTSP type requests for at least one streaming video service of on-demand nature and at least one video service of broadcast nature, the RTSP type requests each including an indicator capable of indicating a type of video service being requested, and said subscriber terminal is configured to generate the RTSP type requests and forward the RTSP type requests towards the proxy unit and the protocol translation unit such that the proxy unit is capable of terminating, on a subscriber side of the network node, the RTSP type requesting protocol for at least two of said streaming video services, and the protocol translation unit is capable of translating the RTSP type requests on the subscriber side into one of at least two requesting protocols on a network side of the network node.

* * * * *